United States Patent [19]
Akimori et al.

[11] Patent Number: 4,776,632
[45] Date of Patent: Oct. 11, 1988

[54] SEAT ADJUSTING APPARATUS FOR AN AUTOMOTIVE VEHICLE

[75] Inventors: Giichiro Akimori; Yoshiaki Kashio, both of Saitama, Japan

[73] Assignee: Honda Giken Kogyo Kabashiki Kaisha, Tokyo, Japan

[21] Appl. No.: 39,204

[22] Filed: Apr. 16, 1987

[30] Foreign Application Priority Data

Apr. 17, 1986 [JP] Japan .................................. 61-88667
Apr. 17, 1986 [JP] Japan .................................. 61-88666
Apr. 17, 1986 [JP] Japan .................................. 61-88665

[51] Int. Cl.$^4$ ............................ A47C 3/00; B62J 1/00
[52] U.S. Cl. .................................... 297/284; 297/195; 297/361; 297/383; 297/DIG. 9; 297/330
[58] Field of Search ................. 297/DIG. 9, 383, 361, 297/362, 330, 284, 195

[56] References Cited

U.S. PATENT DOCUMENTS

| | | | |
|---|---|---|---|
| 592,783 | 11/1897 | Hess | 297/361 |
| 1,770,826 | 7/1930 | Allgeyer | 297/361 |
| 1,788,088 | 1/1931 | Fabio | 297/361 |
| 4,030,750 | 6/1977 | Abram | 297/DIG. 9 |
| 4,225,183 | 9/1980 | Hanagan et al. | 297/DIG. 9 |
| 4,299,316 | 11/1981 | Reinmoeller | 297/330 |
| 4,467,252 | 8/1984 | Takeda et al. | 297/330 |
| 4,500,136 | 2/1985 | Murphy et al. | 297/284 |
| 4,563,038 | 1/1986 | Hirose | 297/DIG. 9 |
| 4,634,179 | 1/1987 | Hashimoto et al. | 297/284 |
| 4,685,735 | 8/1987 | McFalls et al. | 297/361 |

*Primary Examiner*—Francis K. Zugel
*Attorney, Agent, or Firm*—Lyon & Lyon

[57] ABSTRACT

A seat adjusting apparatus for a saddle-type vehicle having a seat provided with a backrest is disclosed. It is provided with an adjusting mechanism for adjusting the state of the backrest, such as the longitudinal position or the tilting angle of the backrest with respect to the seat. A manual operating apparatus connected to this adjusting mechanism and adapted to drive the adjusting mechanism is disposed on the side of the seat below the backrest. The rider can freely adjust the position, angle, etc. of the backrest by operating the manual operating apparatus while maintaining his attitude astride the seat. The backrest may be provided on both sides with waist holding members which are opened and shut sidewards by operating the manual operating apparatus. The adjusting mechanism may instead be driven by an adjusting mechanism drive member such as an actuator or a motor, and an operating switch for operating the adjusting mechanism drive mechanism may be disposed in the vicinity of a steering member of the vehicle. The present invention is also applicable to a seat adjusting apparatus of an automobile.

15 Claims, 19 Drawing Sheets

FIG. I
PRIOR ART
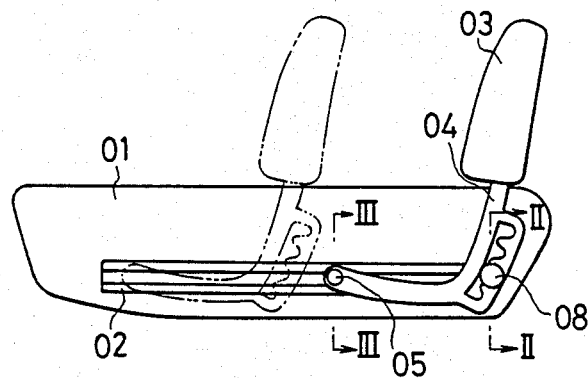
FIG. 2
PRIOR ART
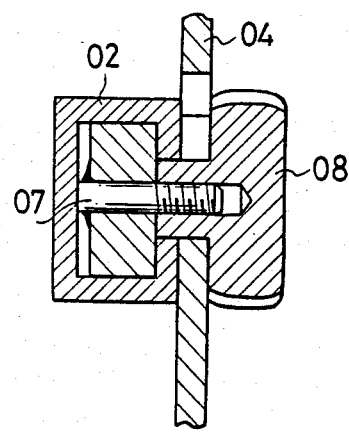
FIG. 3
PRIOR ART
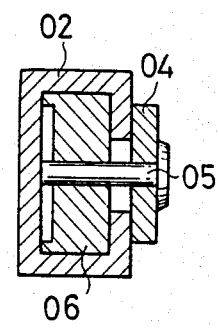

SEAT ADJUSTING APPARATUS FOR AN AUTOMOTIVE VEHICLE

BACKGROUND OF THE INVENTION

This invention relates to an adjusting apparatus for a seat with a backrest mounted on a two-wheeled automotive vehicle such as a motorcycle or a scooter, the seat being of the type which a rider sits astride. More particularly, this invention relates to an adjusting apparatus for the seat of a large motorcycle.

Japanese Utility Model Publication No. 57-36536 describes an adjusting apparatus for a motorcycle having a seat with a backrest whose longitudinal position and angle of inclination can be adjusted.

In that adjusting apparatus, which is illustrated in FIGS. 1 through 3, each side of a seat 01 is provided with a rail 02. The front end of an arm 04 of a backrest 03 has a roller 06 attached thereto by a shaft 05. The roller 06 is engaged with the rail 02. In order to adjust the longitudinal position and angle of inclination of the backrest 03, a knob 08 which is screwed onto a threaded shaft 07 is loosened, and the arm 04 of the backrest 03 is then moved in the longitudinal direction or is tilted about the shaft 06 to change the angle of inclination. When the desired position and angle have been achieved, the arm 04 is secured to the rail 02 by tightening the knob 08 again.

In the above-described adjusting apparatus, the adjusting operation is performed by grasping the knob 08 or shaft 05 disposed directly under the backrest 03 with the rider's hand. Therefore, the rider is unable to perform the adjusting operation sitting on the seat. Namely, he must asjust the seat while dismounted, and after completing the adjustment, he must sit on the seat to find out whether the adjustment of the seat is satisfactory. If it is not, he must again dismount and repeat the adjusting operation. This process may have to be repeated again and again before the rider is satisfied. Thus, seat adjustment using a convetional seat adjusting mechanism is extremely troublesome and time-consuming.

SUMMARY OF THE INVENTION

It is therefore the general object of the present invention to provide a seat adjusting apparatus for an automotive vehicle which solves the above-mentioned problems and makes it possible to quickly and easily adjust a seat.

The present invention is a seat adjusting apparatus for a saddle-type vehicle having a seat provided with a backrest. The seat adjusting apparatus includes an adjusting mechanism for adjusting the position and inclination of the backrest, and a manual operating apparatus connected with the adjusting mechanism which drives the adjusting mechanism, the manual operating apparatus being disposed on one side surface of the seat below the backrest.

According to the present invention, the rider may simply operate the manual operating apparatus located to the side of and below the backrest while sitting on the seat in order to actuate the adjusting mechanism to adjust the position and angle of the backrest as he desires.

If desired, a waist holding member for holding the waist of a rider sitting on the seat may be provided on both sides of the backrest so that the waist holding members can be spread sidewards by the adjusting mechanism. The waist of the rider sitting on the seat is held by the waist holding members, and therefore the rider can comfortably sit on the seat for a long time while driving without the provision of a knee grip for supporting the lower half of his body. In addition, the space between both the waist holding members can be adjusted by the adjusting apparatus to exactly fit the width of the rider's waist.

Furthermore, there may be provided, if desired, a plurality of adjusting mechanisms for adjusting several characteristics of the state of the backrest such as its position and angle of tilt, and the manual operating apparatus may be provided with a selecting operating member for selecting one of the plurality of adjusting members, and a driving operating member for driving the adjusting mechanism which was selected. In this way, various adjustments on the backrest can be performed by one manual operating apparatus very easily.

Furthermore, according to the present invention, there is also provided a seat adjusting apparatus for a vehicle having a seat provided with a backrest, the seat adjusting apparatus comprising an adjusting apparatus for adjusting the state of the backrest, an adjusting mechanism drive member connected to the adjusting mechanism and adapted to drive the adjusting mechanism, and an operating switch for actuating the adjusting mechanism drive member, the operating switch being disposed in the vicinity of a steering member of the vehicle.

According to this seat adjusting apparatus, the rider can adjust the seat position, backrest position and angle, and the like while sitting on the seat in a normal driving posture with his hands placed on the steering member. Therefore, the adjustment can be performed very easily and accurately. In this way, the rider can steer the vehicle while maintaining the most suitable posture for steering according to the shape of his body and his personal preferences.

BRIEF DESCRIPTION OF THE DRAWINGS

FIG. 1 is a side view of a conventional seat adjusting apparatus;

FIG. 2 and FIG. 3 are cross-sectional views taken along line II—II and line III—III, respectively, of FIG. 1;

DETAILED DESCRIPTION OF THE PREFERRED EMBODIMENTS

Figure 4:
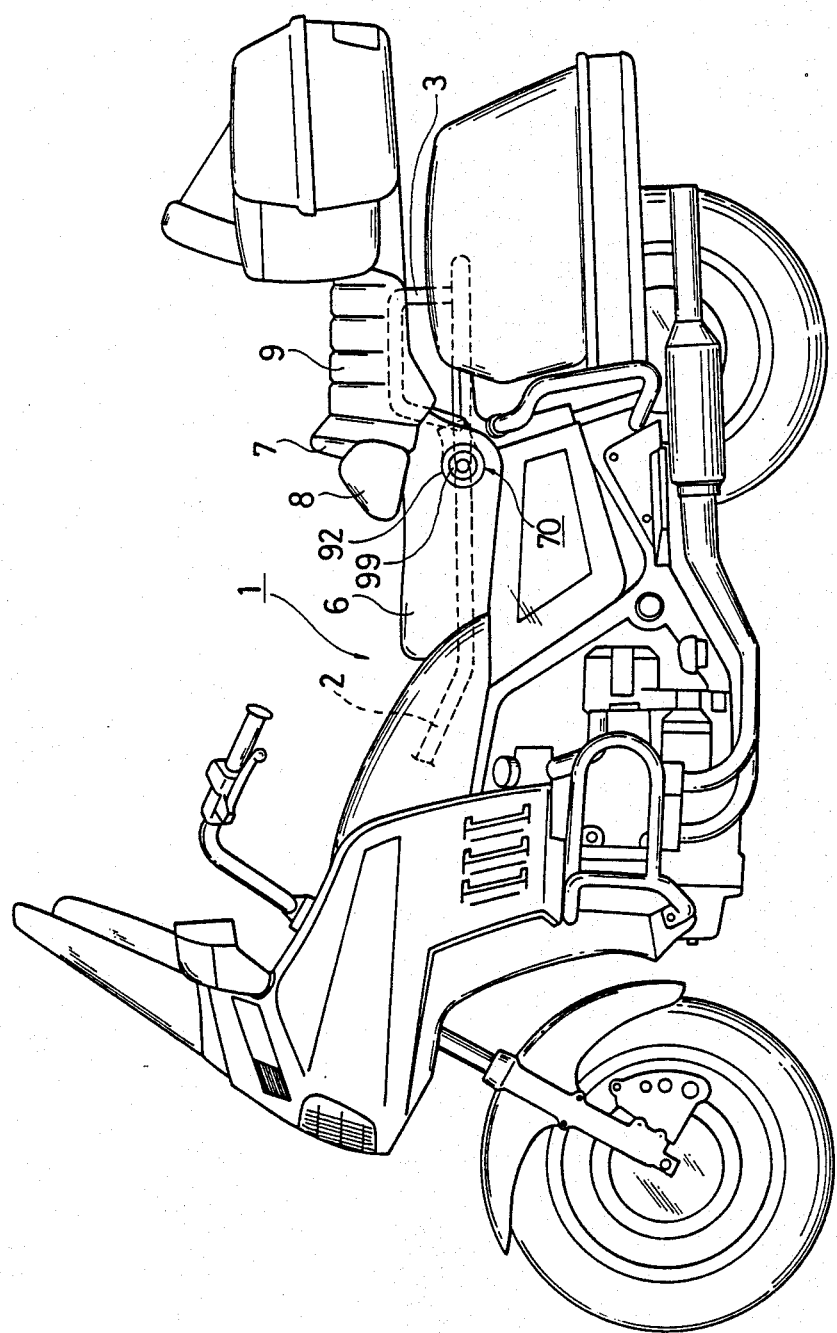
FIG. 4 is a side view of a large motorcycle provided with a saddle-type seat according to the present invention.

First of all, an embodiment of the present invention which is applied to the seat of a large motorcycle will be described while referring to FIGS. 4 through 16.

1. Overall Structure

The vehicle body 1 of a large-sized motorcycle is provided with a pair of left and right side rails 2 which extend backwards, generally in parallel with one another. An upwardly-extending supporting rail 3 is formed on each of the side rails 2 near the rear end thereof. The seat of the motorcycle comprises a front seat 6 and a rear seat 9. The front seat 6 is detachably secured to the side rails 2 in the same way as a conventional seat. The front seat 6 is equipped at its rear part with a backrest 7. The rear seat 9 is disposed behind the backrest 7 and above the front seat 6. A recess is formed in the rear upper surface of the front seat 6 so as to allow the lower end of the backrest 7 to move in the longitudinal direction. The backrest 7 is provided with a pair of side supports 8 which project from both sides thereof and serve as waist holding members.

The backrest 7 is mounted in such a manner as to be movable in the longitudinal direction and tiltable in the longitudinal direction, whereas the side supports 8 are mounted in such a manner as to be able to swing sideways. Furthermore, an adjusting mechanism for adjusting the longitudinal position and tilting angle of the backrest 7 and the swinging angle of the side supports 8 is provided. This adjusting mechanism will be described hereunder.

2. Mounting Structure

Figure 5:
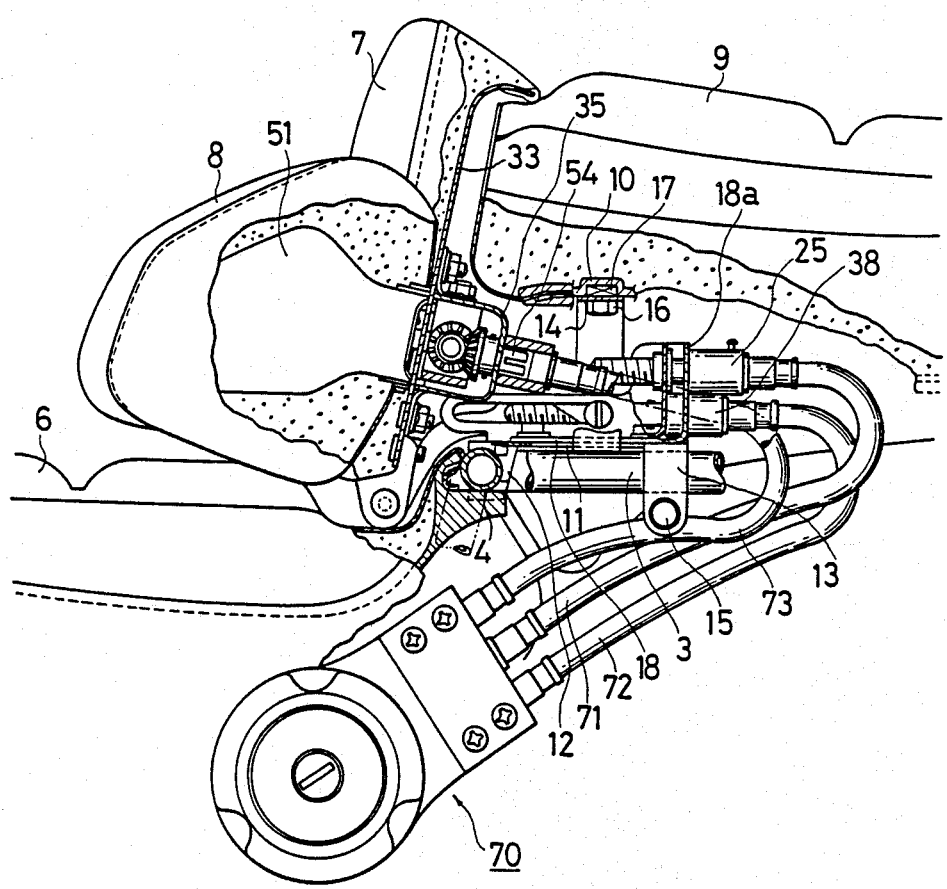
FIG. 5 is an enlarged side view, partly in section, of an important portion of the motorcycle of FIG. 4.
Figure 6:
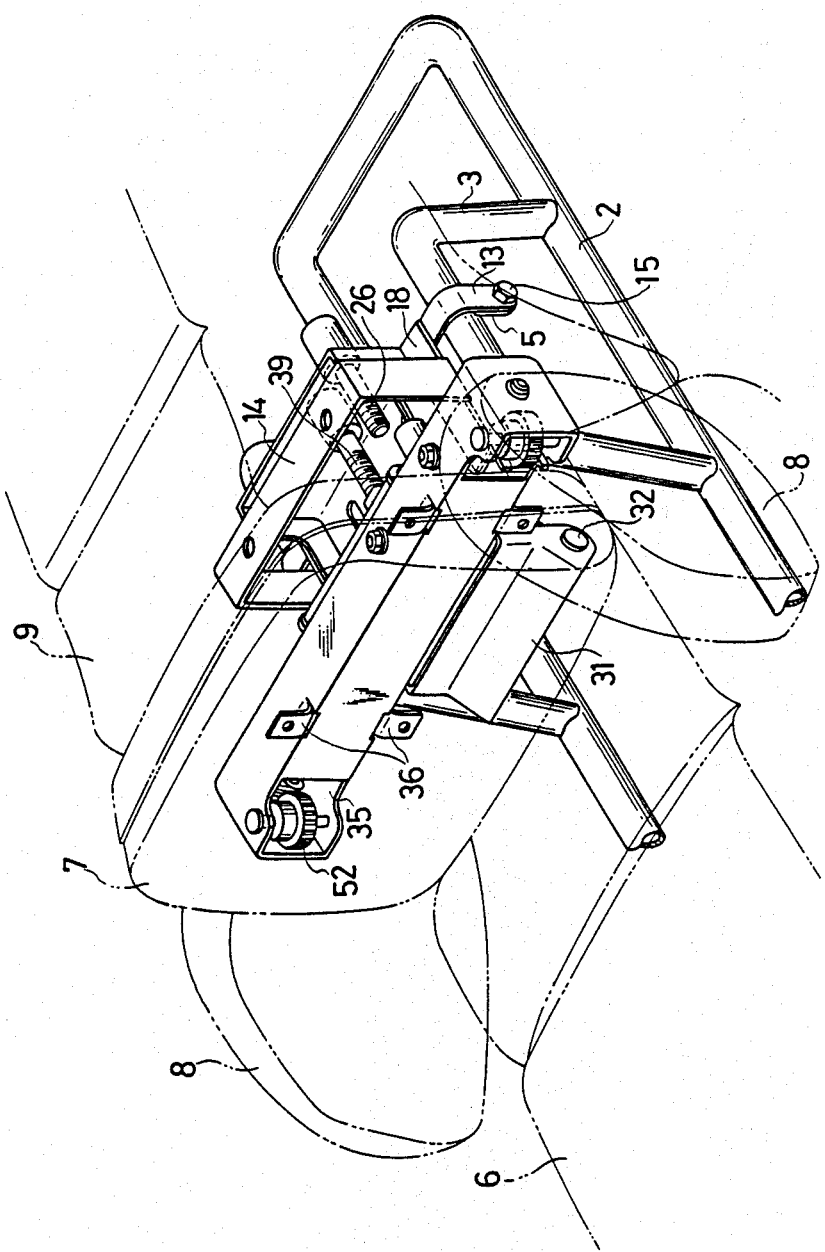
FIG. 6 is a perspective view of a backrest adjusting mechanism as viewed from above and in front.
Figure 7:
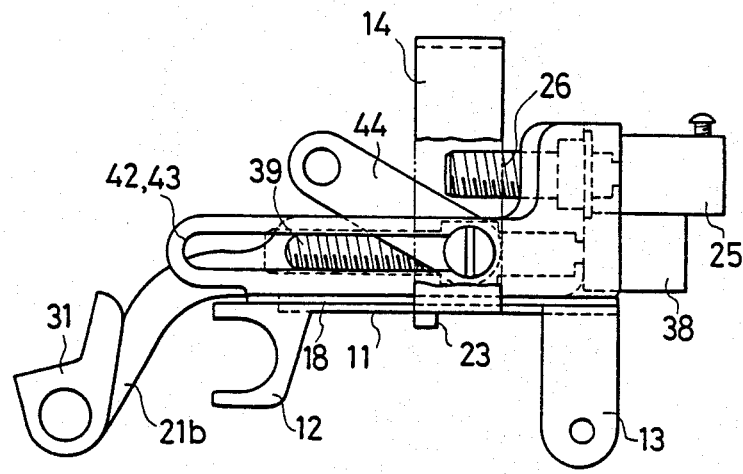
FIG. 7 is a side view of a portion of the backrest adjusting mechanism.

As shown in FIGS. 5 through 7, a hook 12 which can engage with a cross member 4 of the supporting rails 3 is fixed to both sides of the front lower part of a supporting base 11. A securing piece 13 which can contact a bracket 5 which is secured to the supporting rails 3 astride the supporting rails 3 is rigidly secured to both sides of the rear part of the supporting base 11. The supporting base 11 is secured to the supporting rails 3 in such a manner as that the hook 12 is engaged with the cross member 4 and the securing piece 13 is secured to the bracket 5 by a securing bolt 15. Disposed in a generally central portion of the supporting base 11 is a supporting piece 14 which extends upwards from both sides of the base 11 and extends across the base 11. A securing bolt 16 passing through the upper portion of the supporting piece 14 from its lower side to its upper side and screws into a nut 17 which is embedded in a seat bottom plate 10 of the rear seat 9. In this way, the front part of the rear seat 9 is secured to the supporting rails 3.

Figure 9:
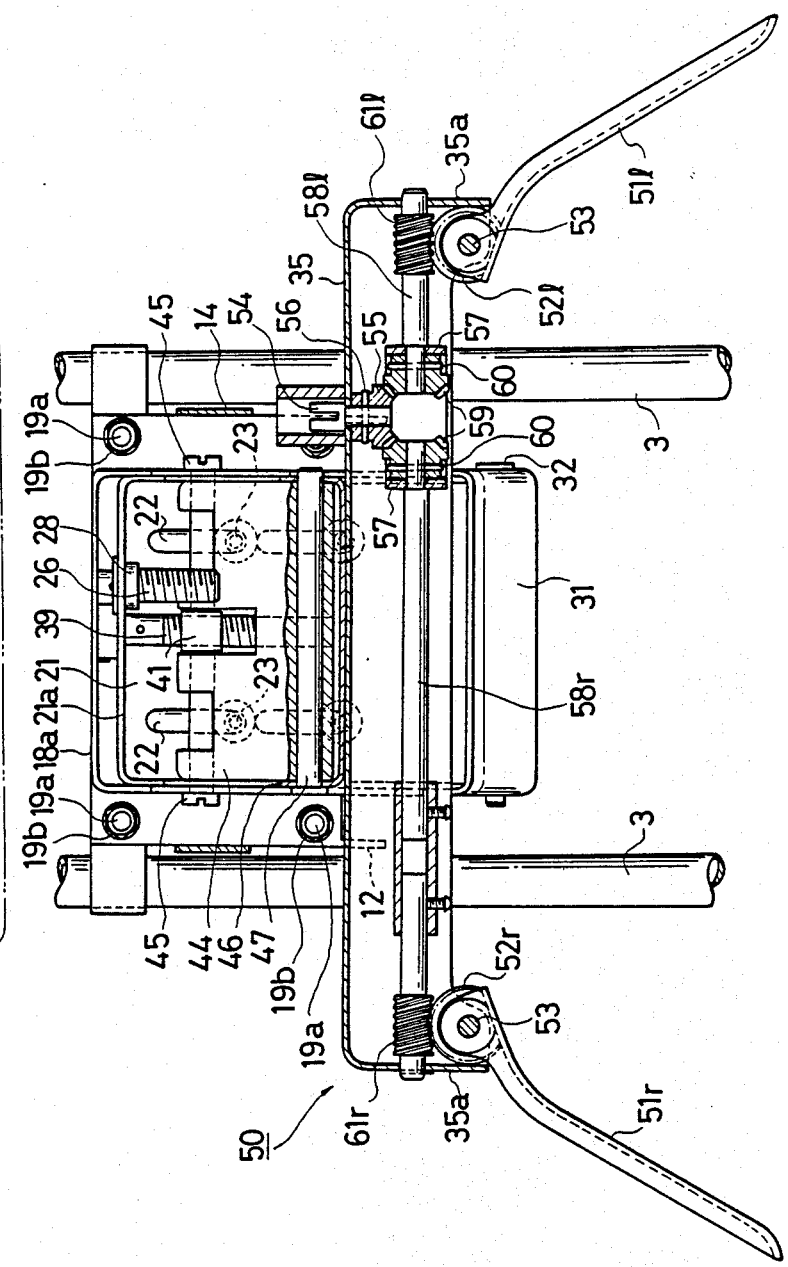
FIG. 9 is a plan view of the backrest adjusting mechanism.
Figure 10:
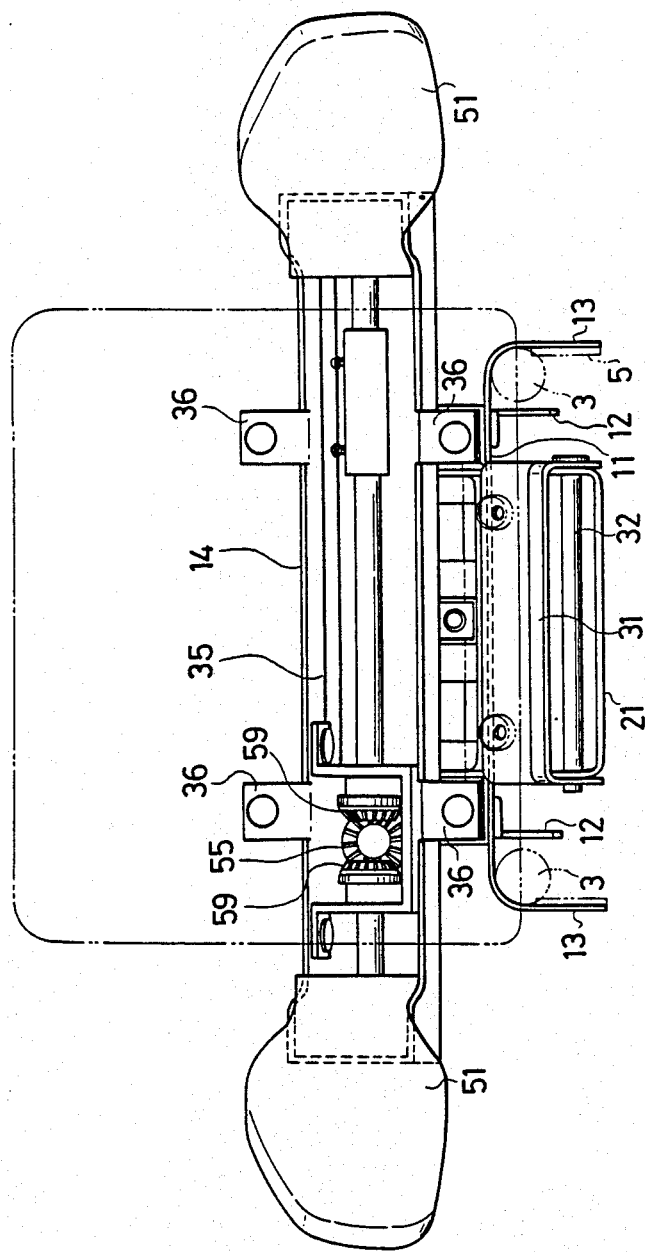
FIG. 10 is a front view of the backrest adjusting mechanism.

An adjusting mechanism frame 18 is disposed on the upper surface of the supporting base 11. As shown in FIG. 9, the adjusting mechanism frame 18 is detachably secured to the supporting base 11 by means of a bolt 19a which passes through the supporting base 11 and the adjusting mechanism frame 18 and screws into a nut 19b.

3. Backrest Slide Mechanism 20

As shown in FIG. 9, a sliding frame 21 is disposed on the adjusting mechanism frame 18. The sliding frame 21 has longitudinally-extending guide slits 22 formed therein. Guide pins 23 which project upwards from the adjusting mechanism frame 18 engage with the guide slits 22. The sliding frame 21 is able to move back and forth with the guide slits 22 being guided by the guide pins 23.

Figure 13:
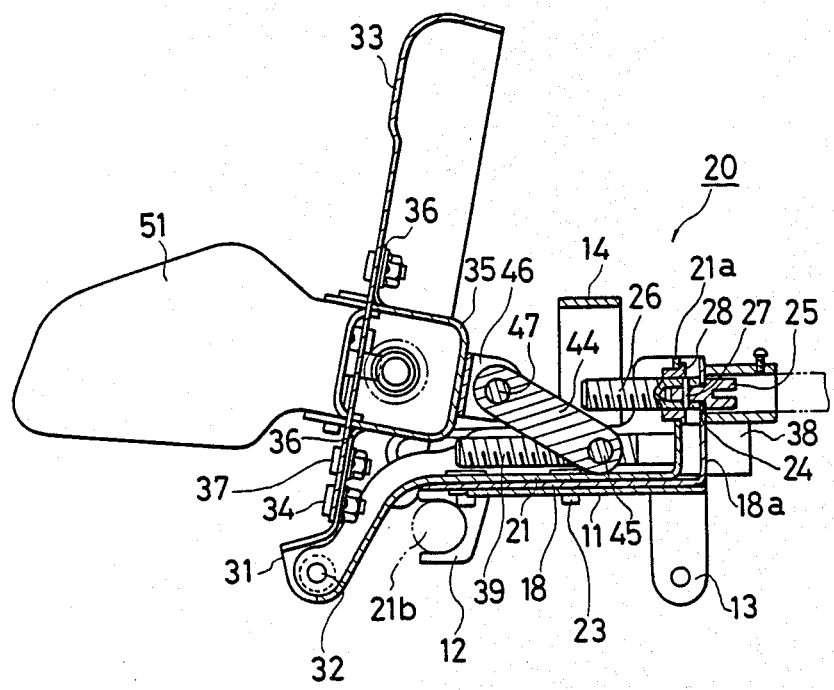
FIG. 13 and FIG. 14 are vertical sectional side views showing the state of operation of a sliding mechanism for sliding the backrest in the longitudinal direction.
Figure 14:
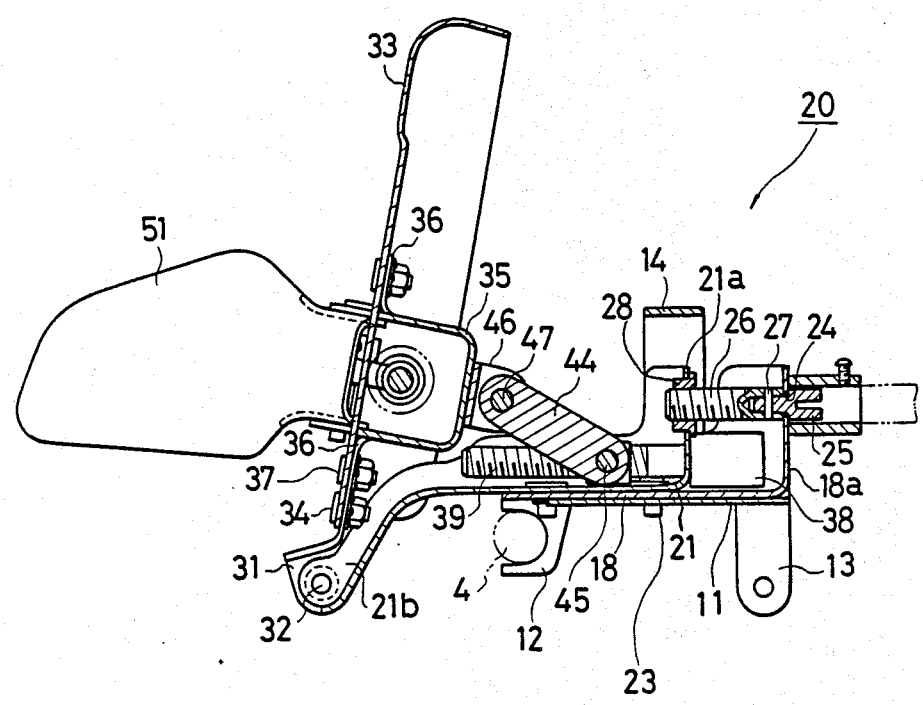

As shown in FIG. 13 and FIG. 14, the rear edge of the adjusting mechanism frame 18 has a rising portion 18a on which is formed a hole 24 into which a forwards-extending slide connecting terminal 25 is fitted. A slide adjusting screw 26 is fitted into the front edge of this slide connecting terminal 25. The slide adjusting screw 26 and the slide connecting terminal 25 are rigidly joined to one another by a pin 27. The slide adjusting screw 26 screws into a female screw 28 which is rigidly secured to a rising portion 21a which forms the rear portion of the sliding frame 21. By the rotation of the slide adjusting screw 26, the sliding frame 21 is moved in the longitudinal direction. FIG. 13 illustrates one state of the sliding frame 21 in which the sliding frame 21 is in a rear position, whereas FIG. 14 illustrates another state of the sliding frame 21 in which it is in a front position.

4. Backrest Tilting Mechanism 30

Figure 8:
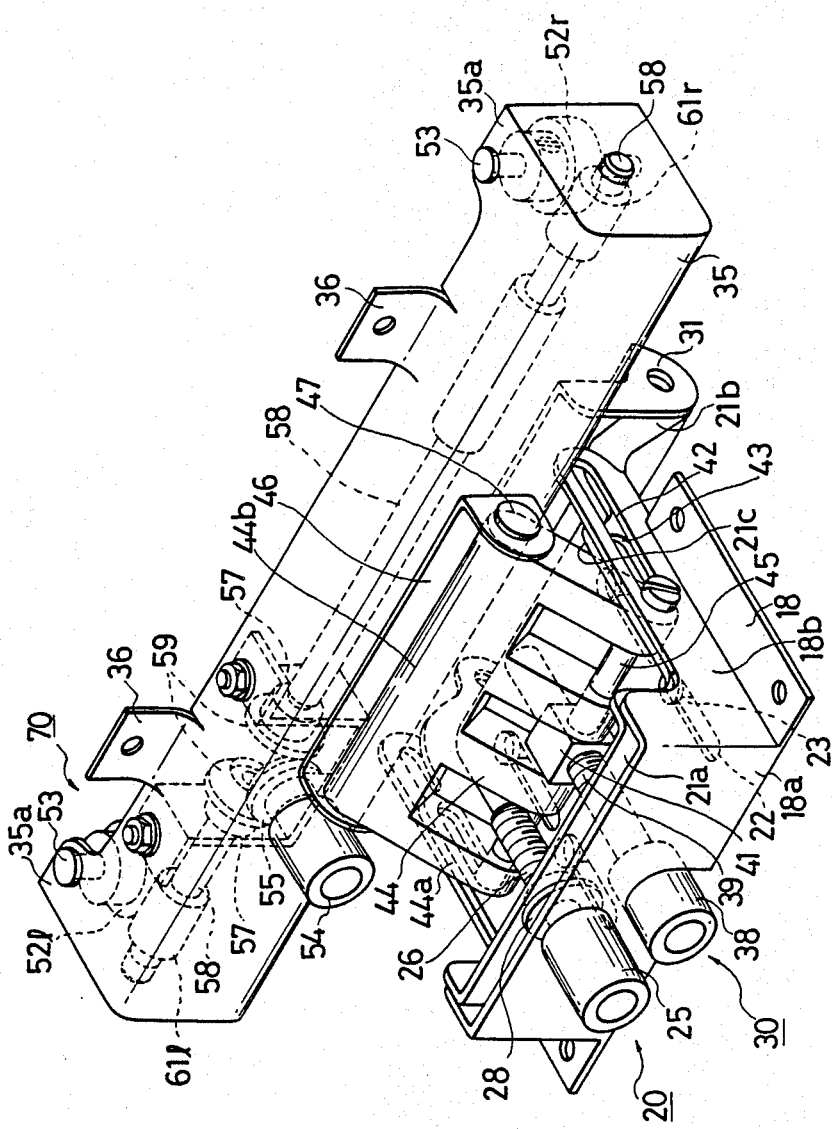
FIG. 8 is a perspective view of the backrest adjusting mechanism as viewed from above and behind.
Figure 15:
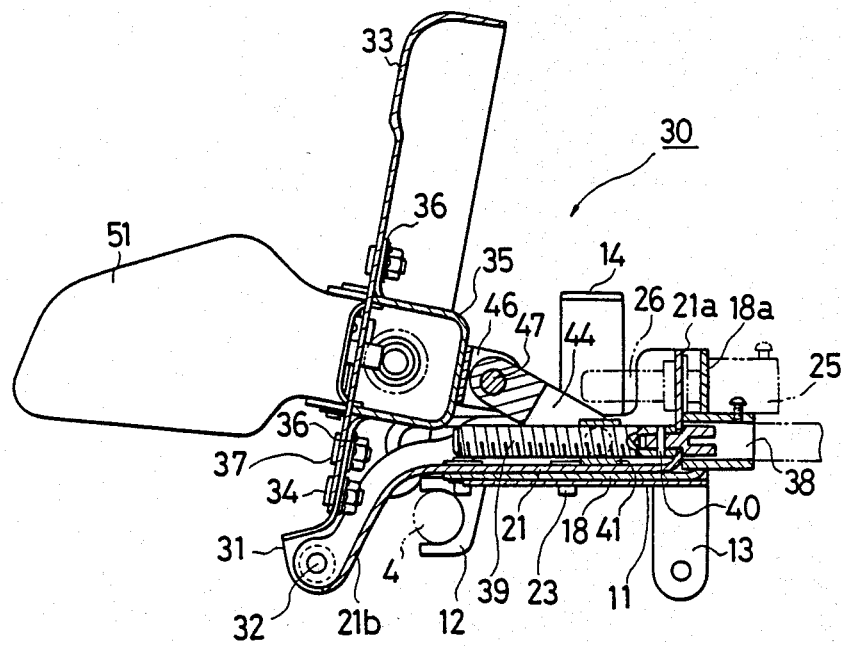
FIG. 15 and FIG. 16 are vertical sectional side views showing the state of operation of a tilting mechanism for tilting the backrest.
Figure 16:
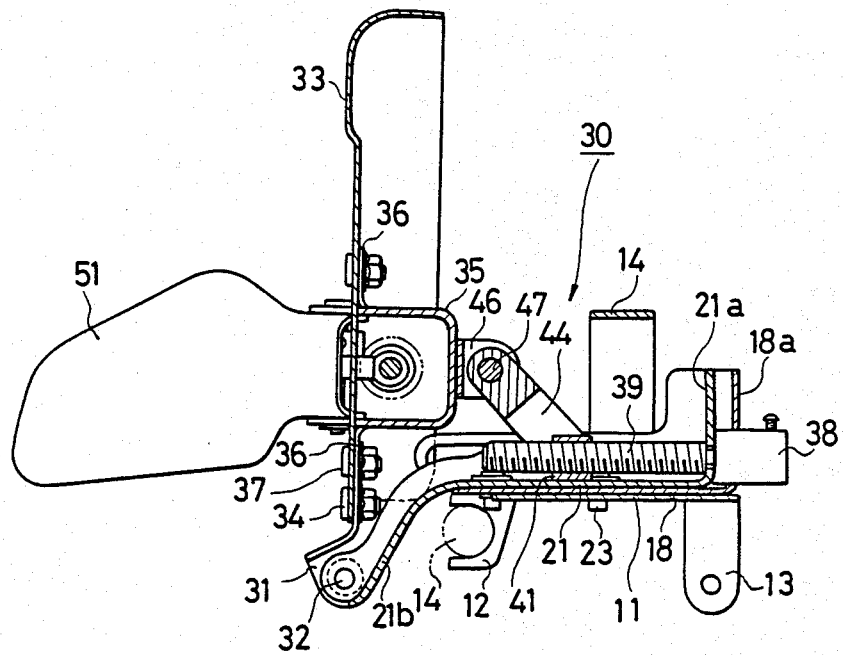

As shown in FIG. 15 and FIG. 16, the front edge portion 21b of the sliding frame 21 curves downwards. The front edge portion 21b pivotably supports a backrest pivotably supporting portion 31 by a shaft 32 so that the backrest pivotably supporting portion 31 can be tilted in the longitudinal direction about the shaft 32. The backrest pivotably supporting portion 31 is rigidly connected with a backrest base plate 33 by a nut and bolt set 34. A securing piece 36 of a backrest supporting frame 35 is rigidly secured to the rear surface of the backrest base plate 33. The rear end rising portion 21a of the sliding frame 21 is provided with a tilt connecting terminal 38 and a tilt adjusting screw 39 which resemble the slide connecting terminal 25 and slide adjusting screw 26, and both members are rigidly joined with one another by a pin 40 (see FIG. 15). The tilt adjusting screw 39 screws into an internally-threaded block 41. As shown in FIG. 8, the adjusting mechanism frame 18 has two side rising portions 18b which have guide slits 42 formed therein, and the sliding frame 21 has two side rising portions 21c which have guide slits 43 formed therein. The upper portion 44b of a fork-like tilt connecting piece 44 is pivotally mounted by a shaft 47 on a bracket 46 provided on the rear surface of the supporting frame 35. The tilt connecting piece has four arms 44a. The two outer arms 44a contact the inner side surfaces of both side rising portions 21c of the slide frame 21, whereas the two inner arms 44a hold the internally-threaded block 41 therebetween. Both side surfaces of the internally-threaded block 41 are secured to supporting shafts 45. These supporting shafts 45 pass through and pivotably support the arms 44a of the tilt connecting piece 44, and the outer end portions thereof are slidably supported by the guide slits 42 and 43.

When the tilt connecting terminal 38 is rotated, the internally-threaded block 41 is moved together with the tilt connecting piece 44 in a direction depending on the rotational direction, and the backrest base plate 33 which is connected with the tilt connecting piece 44 through the shaft 47, the bracket 46, and the backrest supporting frame 35 is tilted about the shaft 32 in the longitudinal direction. FIG. 15 illustrates one state of the backrest base plate 33 which is tilted backwards, whereas FIG. 16 illustrates another state of the backrest base plate 33 when it is vertical.

5. Side Support Opening and Shutting Mechanism 50

As shown in FIG. 9, a worm wheel 52 is secured to the base end of a base plate 51 of each side support 8. Each worm wheel 52 is pivotally mounted on a vertically-extending shaft 53 provided at one end portion 35a of the backrest supporting frame 35. Two opening and shutting drive shafts 58 are rotatably supported by the end portions 35a of the backrest supporting frame 35 and a supporting plate 57 which is provided on the backrest supporting frame 35. A worm 61 is secured to one end of each opening and shutting drive shaft 58 and meshes with the corresponding worm wheel 52. A side support base plate 51, a worm wheel 52, an opening and shutting drive shaft 58, and a worm 61 are provided on both the right and left sides of the supporting frame 35, the reference numerals for those on the left side bearing a lower-case l and the reference numerals for the right side bearing a lower-case r in FIG. 9.

An opening and shutting connecting terminal 54, which is similar to the above-mentioned slide connecting terminal 25, is provided on the rear of the backrest supporting frame 35 on the right side thereof, as viewed in FIG. 9. The opening and shutting connecting terminal 54 is rigidly joined to an opening and shutting adjusting gear 55 by a pin 56. The opening and shutting adjusting gear 55 meshes with left and right gears 59. The left gear 59 is rigidly connected to the left side opening and shutting drive shaft 58l by a pin 60, and the right gear 59 is rigidly connected to the right side opening and shutting drive shaft 58r by another pin 60.

Therefore, when the opening and shutting connecting terminal 54 is rotated, the left and right gears 59 which mesh with the opening and shutting adjusting gear 55 which is rigidly connected to the opening and shutting connecting terminal 54 are rotated in the opposite directions with respect to each other. As a result, the left and right side support base plates 51l, 51r which are indirectly driven by these gears 59 are opened and shut, i.e., swung outwards or inwards in such a manner as to be symmetrical with respect to the center line of the body of the motorcycle.

6. Operating Apparatus 70

An operating apparatus 70 for driving the backrest slide mechanism 20, the backrest tilt mechanism 30, and the side support opening and shutting mechanism 50 is disposed on the left side of the seat 6 under the backrest 7 as shown in Fig. 4. This operating apparatus 70 is connected with the slide connecting terminal 25, the tilt connecting terminal 38, and the opening and shutting connecting terminal 54 by means of cables 71, 72, and 73 respectively, as shown in FIG. 5.

Figure 11:
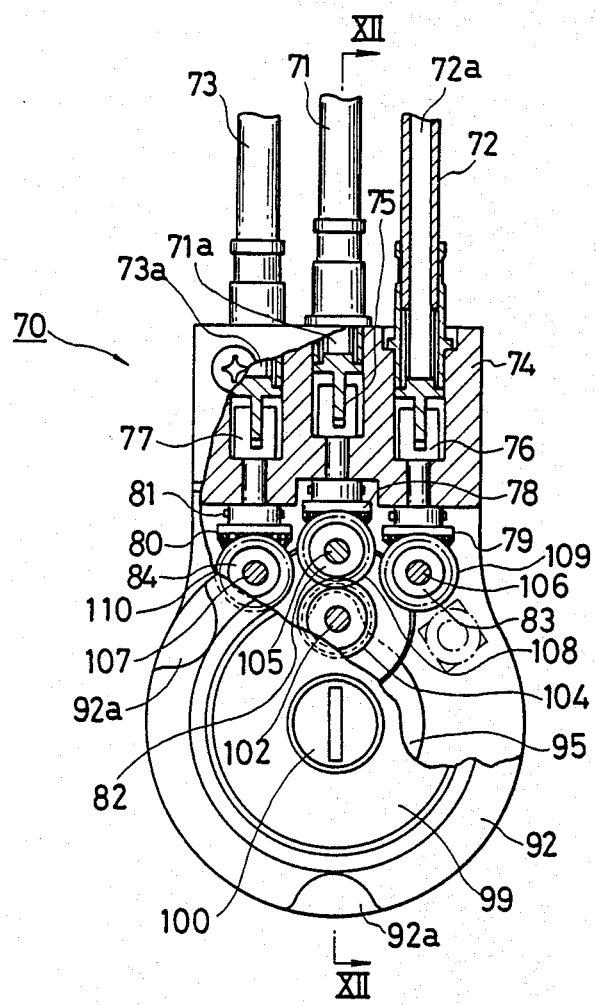
FIG. 11 is a cutaway front view of an operating apparatus.
Figure 12:
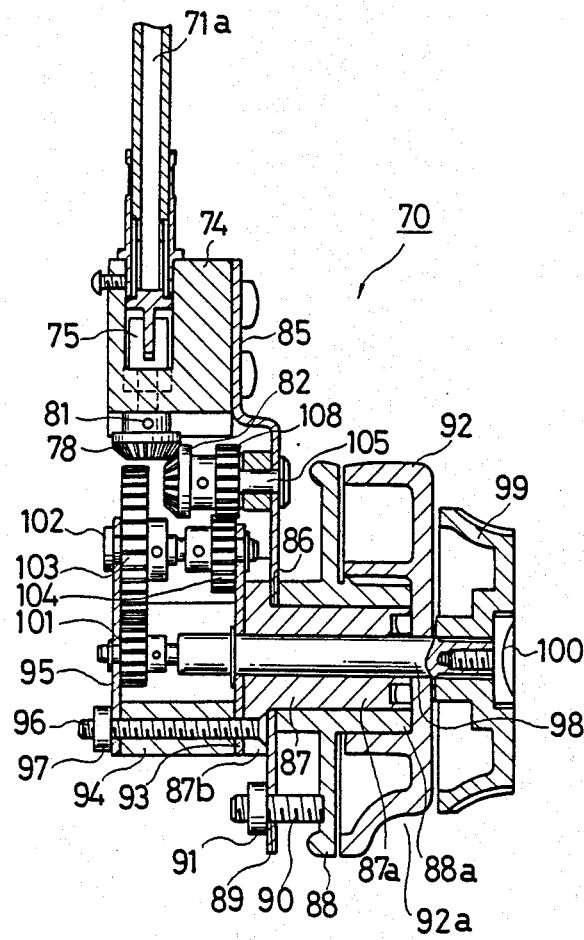
FIG. 12 is a vertical sectional view taken along line XII—XII of FIG. 11.

FIGS. 11 and 12 illustrate in detail the structure of the operating apparatus 70. The body 74 of the operating apparatus 70 houses operating connecting terminals 75, 76, and 77 which are similar to the afore-mentioned slide connecting terminal 25, tilt connecting terminal 38, and opening and shutting connecting terminal 54. These operating connecting terminals 75, 76, and 77 are each connected with one end of core wires 71a, 72a, and 73a of the cables 71, 72, and 73, respectively. Similarly, the other ends of the core wires 71a, 72a, and 73a are respectively connected with the slide connecting terminal 25, the tilt connecting terminal 38, and the opening and shutting connecting terminal 54. Gears 78, 79, and 80 which are secured to the operating connecting terminals 75, 76, and 77 mesh with gears 82, 83, and 84, respectively, which are rotatably supported by a base plate 85 which is secured to the body 74 of the operating apparatus 70.

A switching rotating body 87 is rotatably fitted into a hole 86 formed in the base plate 85. A sleeve portion 88a of a set plate 88 fits over a shaft portion 87a of the switching rotating body 87. On the outer end of the switching rotating body 87, a selector knob 92 is mounted in such a manner as to rotate together with the switching rotating body 87. This selector knob 92 is spline-engaged with the set plate 88. Therefore, when the selector knob 92 is rotated by grasping it with the hand and inserting the fingers into recesses 92a formed on the outer periphery of the selector knob 92, the switching rotating body 87 and the set plate 88 are rotated as a unit. A machine screw 90 which is secured to the set plate 88 passes through an arcuate hole 89 which is formed in the base plate 85 which is concentric with respect to the hole 86. By screwing a nut 91 over this machine screw 90, the switching rotating body 87 and the set plate 88 can be secured to the base plate 85.

Two supporting plates 93 and 95 which are isolated by spacers 94 are secured to the inner end (the left end in Fig. 12) of the switching rotating body 87 by means of a machine screw 96 and a nut 97. An operating shaft 98 which passes through the centers of the switching rotating body 87, selector knob 92, and supporting plate 93 and can rotate with respect thereto is rotatably supported at its inner end by the supporting plate 95, whereas an operating knob 99 is attached to the outer end of the operating shaft 98 by a machine screw 100. The inner end of the operating shaft 98 is provided with a drive gear 101 which meshes with a gear 103 which is secured to a gear shaft 102 which is parallel to the operating shaft 98 and is rotatably supported by supporting plate 93 and supporting plate 95. The gear shaft 102 is also provided with a gear 104 adjacent to the supporting plate 93. Gear set pins 105, 106, and 107 for rotatably mounting the gears 82, 83, and 84 respectively, on the base plate 85 are arranged on a circular arc around the operating shaft 98. A slide drive gear 108, a tilt drive gear 109, and an opening and shutting drive gear 110 are respectively rigidly mounted on the gear set pins 105, 106, and 107. According to the rotating position of supporting plate 93 and supporting plate 95 which rotated together with the switching rotating body 87, gear 104 can be engaged with any one of the slide drive gear 108, the tilt driving gear 109, and the opening and shutting drive gear 110.

a. Sliding of the Backrest

When the operating knob 99 is rotated in the counterclockwise direction in FIG. 11 when the gear 104 is meshed with the slide drive gear 108 as shown in FIG. 11, torque is transmitted to the slide connecting terminal 25 (FIG. 13) through operating shaft 98, drive gear 101, gear shaft 102, gear 104, slide drive gear 108, gear set pin 105, gear 82, gear 78, operating connecting terminal 75, and cable 71. The slide adjusting screw 26 is rotated in the counterclockwise direction as viewed from the back and the female screw 28 is pushed out and forwards as shown in FIG. 14. Together with this motion, slide frame 21, backrest pivot supporting portion 31, backrest base plate 33, backrest supporting frame 35, and side support base plate 51 are moved forwards, and the backrest 7 and side supports 8 are slid forwardly. When the operating knob 99 is rotated in the clockwise direction, the backrest 7 and side supports 8 are slid from the front position in FIG. 14 to the back position of FIG. 13.

b. Tilting of the Backrest

When the selector knob 92 is rotated clockwise from the state of FIG. 11, the gear 104 is brought into mesh with the tilt drive gear 109. Then, when the operating knob 99 is rotated in the counterclockwise direction, as described before, the tilt adjusting screw 39 of FIG. 15 is rotated in the counterclockwise direction as viewed from the back, the internally threaded block 41 is pushed forwards as shown in FIG. 16, the bracket 46 is pushed forwards through the tilt connecting piece 44, the backrest base plate 33 is pivoted forwards about the shaft 32, and the backrest 7 is rotated towards a vertical position. When the operating knob 99 is rotated in the clockwise direction, the backrest 7 is tilted from the vertical position of FIG. 16 to the tilted position of FIG. 15.

c. Opening and Shutting of Side Supports

When the selector knob 92 is rotated in the counterclockwise direction from the state of FIG. 11, gear 104 is brought into engagement with the opening and shutting driving gear 110. Then, when the operating knob 99 is rotated in the clockwise direction, in the same manner as described above, the opening and shutting connecting terminal 54 of FIG. 9 is rotated in the clockwise direction as viewed from the back. As a result of this rotation, the right side support base plate 51r is rotated in the clockwise direction when viewed from above, whereas the left side support base plate 51l is rotated in the counterclockwise direction when viewed from above. As a result, both side supports 8 are opened, i.e., swung outwards with respect to each other. When the operating knob 99 is rotated in the opposite direction, both side supports 8 are shut, i.e., swung inwards towards each other.

In this way, by rotating the operating knob 99 in the clockwise or counterclockwise direction after the gear 104 is brought into mesh with any one of the slide drive gear 108, the tilt drive gear 109, and the opening and shutting drive gear 110 by properly rotating the selector knob 92, the longitudinal position or angle of tilt the backrest 7 can be adjusted in accordance with the preference of the rider, and the degree of opening of the left and right side supports 8 can be adjusted so that the waist of the rider sitting on the front seat 6 is properly held by the side supports 8. The side supports 8 can also be used as knee grip member which a fellow rider sitting on the rear seat 9 holds between his thighs or knees.

Figure 17:
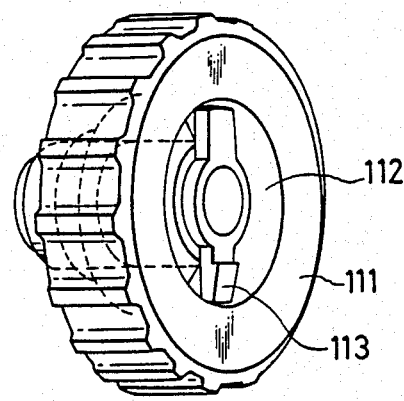
FIG. 17 is a perspective view of an important portion of another embodiment of the present invention.
Figure 18:
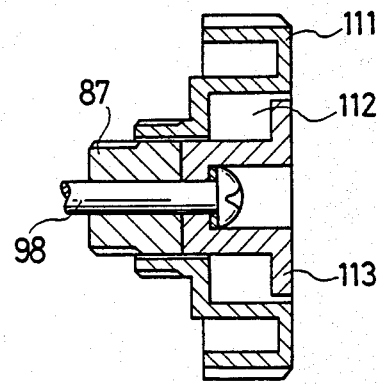
FIG. 18 is a vertical sectional side view of the member of Fig.17.

In the embodiments shown in FIGS. 4 through 16, the disk-shaped operating knob 99 is concentrically disposed on the outer side of the selector knob 92. If desired, however, it may be modified as shown in FIGS. 17 and 18, in which a cylindrical recess 12 is formed in the center of a selector central knob 111. An operating handle 113 is rotatably disposed within this cylindrical recess 112 and is secured to the operating shaft 98.

Figure 19:
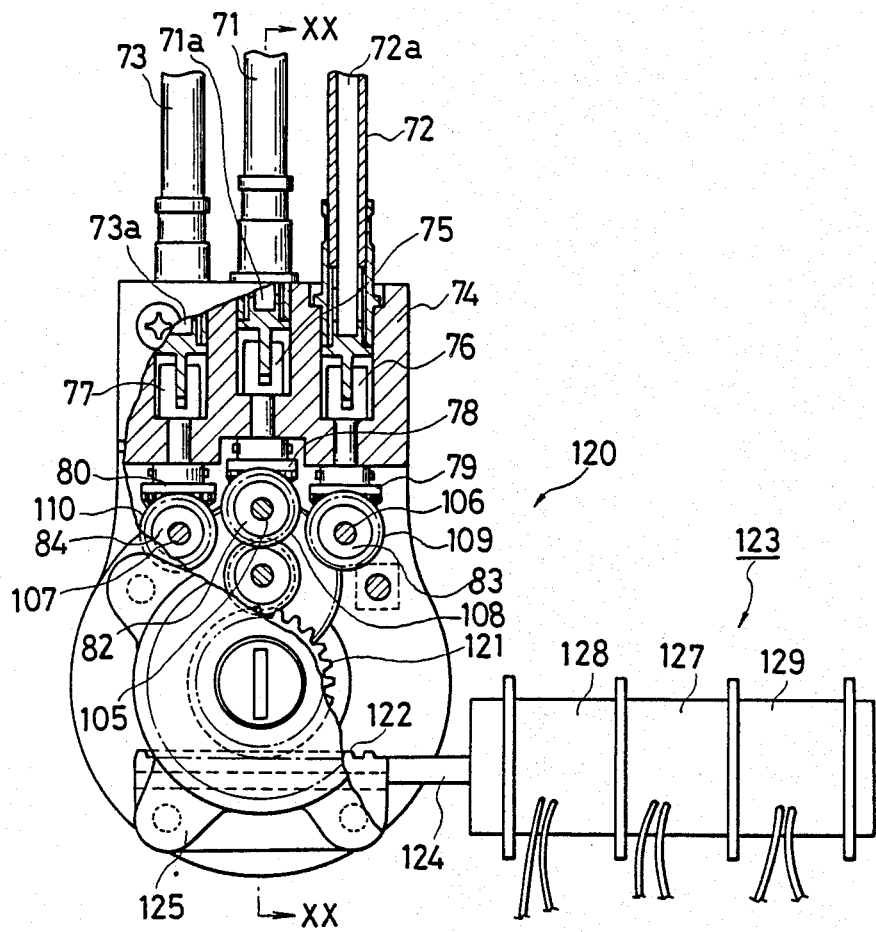
FIG. 19 is a cutaway front view of an operating apparatus according to still another embodiment of the present invention.
Figure 20:
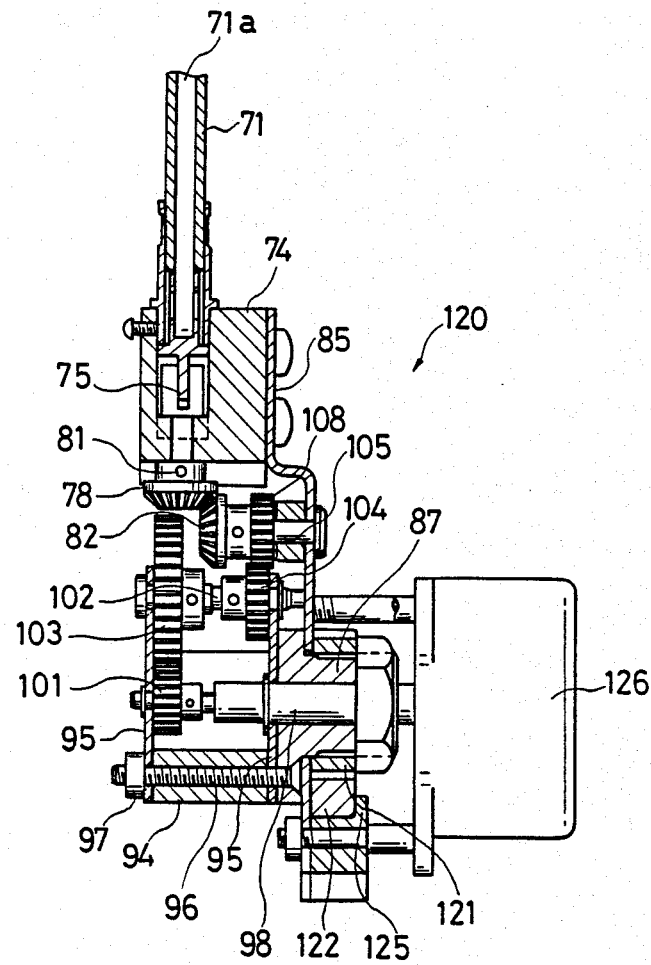
FIG. 20 is a vertical sectional view taken on line XX—XX of FIG. 19.
Figure 21:
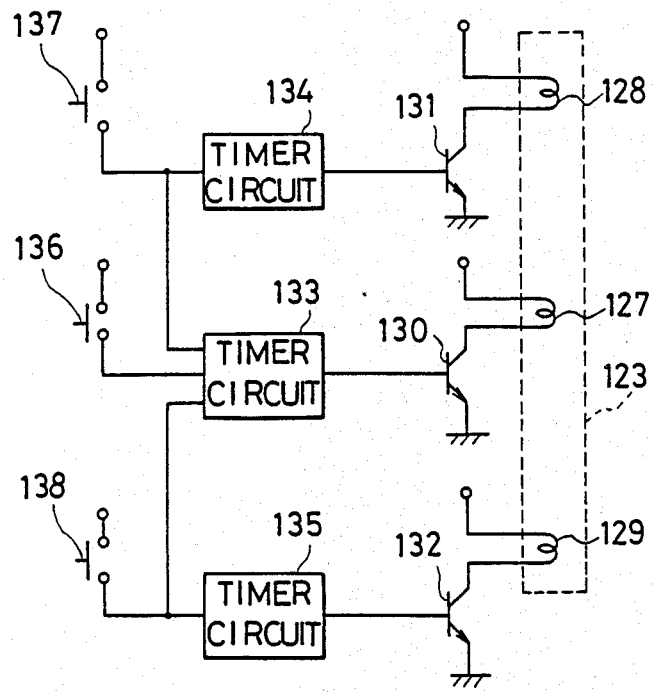
FIG. 21 is a control circuit of the operating apparatus of FIG. 19.

FIGS. 19 through 22 illustrate still another embodiment of the present invention. Since the adjusting mechanisms of this embodiment are exactly the same as the afore-mentioned adjusting mechanisms 20, 30 and 50, illustrations thereof have been omitted. Instead, only an operating apparatus 120 is shown in FIGS. 19 and 20. Since the basic structure of the operating apparatus 120 is also generally the same as that of the operating apparatus 70 of the preceding embodiment, like parts are denoted by like reference numerals, and a detailed description thereof is omitted.

In this embodiment, a gear 121 is secured to a switching rotating body 87 so as to rotate therewith. This gear 121 meshes with a rack 122. The rack 122 is formed on an end portion of a movable piece 124 of a three-element linear digital actuator 123 which will be described hereinafter in detail. The movable piece 124 is slidably guided and supported by a support piece 125 which is secured to a base plate 85. When the three element linear digital actuator 123 is set in any one of three positions which will be described hereinafter, the gear 121 is rotated together with the switching rotating body 87 by the rack 22. As a result of this rotation, a gear 104 is selectively meshed with any one of a slide drive gear 108, a tilt drive gear 109, and an opening and shutting drive gear 110. The base plate 85 is also provided with an operating motor 126. An extension of the output shaft of the operating motor 126 acts as an operating shaft 98.

The three-element linear digital actuator 123 contains three solenoids 127, 128, and 129. The solenoids 127, 128, and 129 are connected to the collectors of three emittergrounded transistors 130, 131, and 132, respectively. The bases of the transistors 130, 131, and 132 are connected to the output terminals of three timer circuits 133, 134, and 135, respectively. The input terminals of the timer circuits 133, 134, and 135 are connected to a slide set switch 136, a tilt set switch 137, and an opening and shutting set switch 138, respectively. Furthermore, the tilt set switch 137 and the opening and shutting set switch 138 are also connected to timer circuit 133. When, for example, the tilt set switch 137 is closed, an output is emitted from timer circuit 133. After this output becomes zero, an output from timer circuit 134 is emitted. The same is true for the opening and shutting set switch 138.

It is presumed here that the movable piece 124 occupies a slide drive position in which the gear 104 meshes with the slide drive gear 108 as shown in FIG. 19. When the slide set switch 136 is closed in this state, an output from timer circuit 133 is emitted to excite soleneoid 127. However, since the movable piece 124 is already in the slide drive position corresponding to the exciting of solenoid 127, the movable piece 124 is not moved. Then, when the operating motor 126 is rotated, the backrest 7 is slid forwards or backwards according to the rotational direction. When the tilt set switch 137 is closed in the state of FIG. 19, an output is emitted from timer circuit 133 which first excites solenoid 127 as already described. However, the movable piece 124 is not moved at this stage. Then, when an output from timer circuit 134 is emitted to excite solenoid 128, the movable piece 124 is moved to the left in FIG. 19. As a result, the gear 104 is moved to a tilt drive position in which the gear 104 is meshed with the tilt drive gear 109. When the opening and shutting set switch 138 is closed while the movable piece 124 occupies the tilt drive position, solenoid 127 is excited first, thereby returning the movable piece 124 to the slide drive position of FIG. 19. Then, when solenoid 129 is excited, the movable piece 124 is moved to the opening and shutting drive position in which the gear 104 is meshed with the opening and shutting drive gear 110.

In this way, by properly selecting any one of the slide set switch 136, the tilt set switch 137, and the opening and shutting set switch 138 and closing it, the gear 104 is brought into engagement with the slide drive gear 108, tilt drive gear 109, or opening and shutting drive gear 110, respectively, so that it is set to any one of a backrest slide drive state, a backrest tilt drive state, and a side support opening and shutting drive state.

Figure 22:
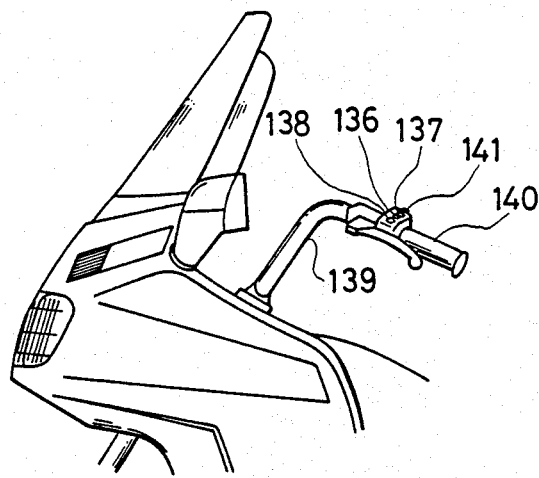
FIG. 22 is a side view showing the handle bars of a motorcycle which is provided with the operating apparatus of FIG. 19.

The afore-mentioned slide set switch 136, tilt set switch 137, and opening and shutting set switch 138 are disposed in the vicinity of a grip 140 of the handle bars 139 of the motorcycle as shown in FIG. 22. Furthermore, an operating switch 141 of the operating motor 126 is disposed adjacent to these switches 136, 137, and 138. Three-stage operation, i.e., forward, reverse, and stop, of the operating motor 126 can be controlled by the operating switch 141. Therefore, the rider can freely adjust the longitudinal position of the backrest 7, the tilting angle of the backrest 7, and the angle of opening of the side supports 8 by suitably operating the slide set switch 136, tilt set switch, opening and shutting set switch 138, and operating switch 141 which are disposed in the vicinity of the grip 140, while sitting on the front seat in a normal attitude for riding.

In the embodiment of FIGS. 19 and 22, the longitudinal position of the backrest 7, the tilting of the backrest 7, and the angle of opening of the side supports 8 can be adjusted by the three-element linear digital actuator 123 and operating motor 126 which are capable of setting the three positions. Alternatively, each of the slide connecting terminal 25, tilt connecting terminal 38, and opening and shutting connecting terminal 54 may be directly connected with an individual motor. The same object can be obtained by rotating these motors in forward and reverse.

Figure 23:
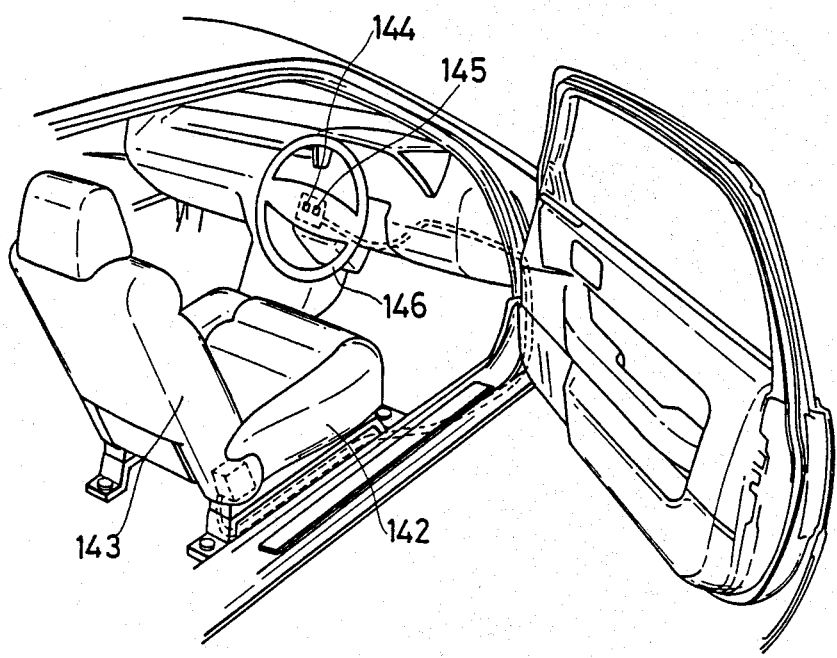
FIG. 23 is a schematic perspective view showing still another embodiment of the present invention.

The present invention is also applicable to a seat of an automobile as shown in FIG. 23. In the illustrated automobile, the longitudinal position of a seat 142 and the tilting angle of a backrest 143 are separately adjustable by separate, unillustrated motors. A seat position adjusting switch 144 and a backrest tilt adjusting switch 145 for controlling these motors are provided at the center of a steering wheel 146.

What is claimed is:

1. A seat adjusting apparatus for a saddle-type vehicle having a seat provided with a backrest including a plurality of adjusting mechanisms for adjusting several characteristics of the state of said backrest respectively, an operating apparatus separated from said adjusting mechanisms and connecting means for drivingly connecting said adjusting mechanisms and said operating apparatus with each other, said operating apparatus being disposed on one side surface of said seat below said backrest and comprising a selecting means with a first knob for mechanically selecting any one of said plurality of adjusting mechanisms to bring it into an operating state and a driving means with a second knob for mechanically driving such selected adjusting mechanism through said connecting means.

2. A seat adjusting apparatus as claimed in claim 1, wherein said backrest is provided at both side portions with waist holding members adapted to hold the waist of a rider and said adjusting mechanism is connected with said waist holding members so that said waist holding members are swung sidewards toward and away from one another.

3. A seat adjusting apparatus as claimed in claim 1, wherein said connecting means are cables.

4. A seat adjusting apparatus as claimed in claim 1, wherein said first and second knobs are disposed on one and the same axis.

5. A seat adjusting apparatus for a saddle-type vehicle having a seat provided with a backrest, including a plurality of adjusting mechanisms for respectively adjusting several characteristics of the state of said backrest; an operating apparatus separated from and drivingly connected with said adjusting mechanisms comprising a selecting means for selecting any one of said plurality of adjusting mechanisms to bring it into an operating state and a driving means for driving such selected adjusting mechanism; an actuator incorporated into said selecting means; a drive motor incorporated into said driving means; an actuator operating switch disposed in the vicinity of a steering member of said vehicle and adapted to actuate said actuator; and a drive motor operating switch disposed adjacent to said actuator operating switch and adapted to actuate said drive motor.

6. A seat adjusting apparatus for a saddle-type vehicle having a seat provided with a backrest including a plurality of adjusting means for effecting a corresponding number of adjustments of said backrest with respect to said seat, operating apparatus remote from said adjusting means, connecting means for drivingly connecting said operating apparatus to said adjusting means said operating apparatus comprising a plurality of independently rotatably mounted driven gears drivingly associated each with one of said adjusting means, and a driving gear rotatably mounted on an axis selectively movable between the respective of said driven gears.

7. A seat adjusting apparatus as claimed in claim 6, wherein said driven gears are rotatably mounted on axes that are circumferentially disposed on arcuate spacing, and said driving gear axis is mounted for selective arcuate translation into meshing engagement with each of said driven gears.

8. A seat adjusting apparatus as claimed in claim 7, including a switching body rotatable about an axis, said driving gear being rotatably mounted on said switching body with the axis of said driving gear being radially spaced from that of said switching body, means for rotating said driving gear and means for rotating said switching body.

9. A seat adjusting apparatus as claimed in claim 8, wherein said rotating means are manually driven.

10. A seat adjusting apparatus as claimed in claim 9, wherein said rotating means comprise manually operated knobs drivingly connected to each of said axes.

11. A seat adjusting apparatus as claimed in claim 8, wherein said rotating means are motor driven.

12. A seat adjusting apparatus as claimed in claim 11, wherein said rotating means comprise a ring gear on said switching body, a motorized rack drivingly connected to said ring gear and a drive motor carried by said switching body for driving said driving gear.

13. A seat adjusting apparatus as claimed in claim 6, wherein one of said adjusting means comprises means for moving said backrest longitudinally of said seat, said one adjustment means including a support bracket on said vehicle fixed with respect to said seat, a movable bracket mounting said backrest and engaging said support bracket for sliding movement therebetween, a rotatable drive screw axially secured with respect to said support bracket, a threaded nut secured to said moving bracket and engaging said drive screw, and means for rotating said drive screw including an elongated cable connected between said drive screw and one of said operating apparatus driven gears.

14. A seat adjusting apparatus as claimed in claim 13, wherein one of said adjusting means comprises means for adjusting the angular disposition of said backrest with respect to said seat, said one adjustment means including a pivot connection between one end of said backrest and said movable bracket, a second rotatable drive screw axially secured with respect to said movable bracket, a second threaded nut movable along second drive screw in response to rotation thereof, link means connecting between said backrest and said second nut to move said backrest about said pivot connection in response to rotation of said second drive screw, and means for rotating said second drive screw including an elongated cable connection between said second drive screw and another of said operating apparatus driven gears.

15. A seat adjusting apparatus as claimed in claim 14 including oppositely acting waist holding members carried by rotatable pins at opposite lateral ends of said backrest, a driven gear on each of said pins, a drive gear for driving said driven gears, and means for rotating said drive gear including an elongated cable connected between said drive gear and a third of said operating apparatus driven gears.

* * * * *